United States Patent [19]

Imoto

[11] Patent Number: 4,826,294
[45] Date of Patent: May 2, 1989

[54] LIGHTING DEVICE FOR A LIQUID CRYSTAL DISPLAY DEVICE

[75] Inventor: Satoshi Imoto, Tanashi, Japan

[73] Assignee: Citizen Watch Co., Ltd., Tokyo, Japan

[21] Appl. No.: 164,336

[22] Filed: Mar. 4, 1988

[30] Foreign Application Priority Data

Mar. 4, 1987 [JP] Japan .................................. 62-47609

[51] Int. Cl.$^4$ .............................................. G02F 1/13
[52] U.S. Cl. .................................................... 350/345
[58] Field of Search ................ 350/345; 362/260, 348, 362/347, 346

[56] References Cited

U.S. PATENT DOCUMENTS

| 4,334,734 | 6/1982 | Haseng et al. ........................ 350/345 |
| 4,562,517 | 12/1985 | Pankin .................................. 362/346 |
| 4,618,216 | 10/1986 | Suzawa ................................. 350/345 |
| 4,646,158 | 2/1987 | Ohno et al. ........................... 340/784 |
| 4,748,546 | 5/1988 | Ukrainsky ............................ 350/345 |

FOREIGN PATENT DOCUMENTS 53-13166 2/1978 Japan .
62-27329 2/1987 Japan .

*Primary Examiner*—Stanley D. Miller
*Assistant Examiner*—Anita E. Pellman
*Attorney, Agent, or Firm*—Birch, Stewart, Kolasch & Birch

[57] ABSTRACT

A device for back-lighting a liquid crystal display device has a lamp having a light emitting straight portion and a reflector plate. The reflector plate has a central portion provided under the light emitting straight portion and a pair of inclined side portions adjacent both sides of the central portion, the central portion having a total reflection surface, and each the side portion having a diffuse reflection surface.

13 Claims, 7 Drawing Sheets

LIGHTING DEVICE FOR A LIQUID CRYSTAL DISPLAY DEVICE

BACKGROUND OF THE INVENTION

The present invention relates to a device for lighting a liquid crystal display device employed, for example, in a television, and more particularly to a back-lighting device for the liquid crystal display device. It is required to light the lighting device at uniform luminance.

Such lighting devices are disclosed in Japanese Utility Model Applications, Laid-open Nos. 53-13166 and 62-27329.

In the application of No. 53-13166, a reflector of a lighting device is provided under a liquid crystal display panel. The reflector has a plurality of flat surface portions and a plurality of uneven or rough surface portions which are combined to form a surface of a striped, checkered, or spotted pattern. A lamp is provided above the reflector, and the light from the lamp is reflected on the flat surface portions in total reflection and on the uneven surface portions in diffuse reflection, so that the display panel is uniformly lighted.

In the application of No. 62-27329, a lighting device is provided under a liquid crystal display panel, interposing a diffusion sheet. The lighting device comprises a pair of parabolic mirrors with rough surfaces and a pair of fluorescent lamps mounted above the corresponding mirrors. Thus, the light from the lamps which are provided between the mirrors and the diffusion sheet is reflected in diffuse reflection for uniformly lighting the display panel.

However, there are disadvantages in the prior art disclosures as follows. In the former device, since the reflector is formed in flat and the lamp is provided at the outside of the reflector, the light from the lamp does not reach sufficiently to portions of the display panel apart from the lamp, so that the entire surface of the panel cannot be uniformly lighted.

In the latter device, it is necessary to provide a sufficient distance between the diffusion sheet and parabolic mirrors for preventing the diffusion sheet from abnormally brightening at portions adjacent the lamps. If a sufficient distance is provided, the luminance of the diffusion sheet as a whole decreases to deteriorate lighting efficiency. Further, the disposition of the large space causes an increase in size and thickness of the display device.

In order to eliminate these defects, the parabolic mirror of the latter device may be substituted with a parabolic mirror having a total reflection surface. However, since the luminance characteristics are dependent on the shape of the reflector, manufacturing the reflector is complicated requiring many steps. Further, since light reflects on the total reflection surface at an angle of reflection equal to an angle of incidence, the light is liable to aggregate at opposite side portions of the display panel.

SUMMARY OF THE INVENTION

An object of the present invention is to provide a back-lighting device for a liquid crystal display device which may eliminate the above described disadvantages.

Another object of the present invention is to provide a lighting device which may provide a uniform luminance distribution in a display zone with an excellent lighting efficiency.

According to the present invention, there is provided a lighting device for a liquid crystal display device having a liquid crystal display panel, comprising, a lamp having a light emitting straight portion and provided under the liquid crystal display panel, a reflector plate having a central portion provided under the light emitting straight portion, and a pair of side portions adjacent both sides of the central portion, the central portion having a total reflection surface, and each the side portion having a diffuse reflection surface.

In an aspect of the invention, the reflector plate is curved so as to surround the light emitting straight portion of the lamp.

In another aspect of the invention, the reflector plate has a flat portion in parallel with the liquid crystal display panel and a pair of side portions which are upwardly bent at both sides of the flat portion, the total reflection surface is provided on the flat portion and the diffuse reflection portions are provided on the side portions. The reflector plate may be a flexible plate having a diffuse reflection surface, and the total reflection surface is formed by attaching mirror material. The ratio of the area of the total reflection surface to the total area of the diffuse reflection surfaces is 1:2.

These and other objects and features of the present invention will become more apparent from the following detailed description with reference to the accompanying drawings.

DETAILED DESCRIPTION OF THE PREFERRED EMBODIMENTS

Figure 1:
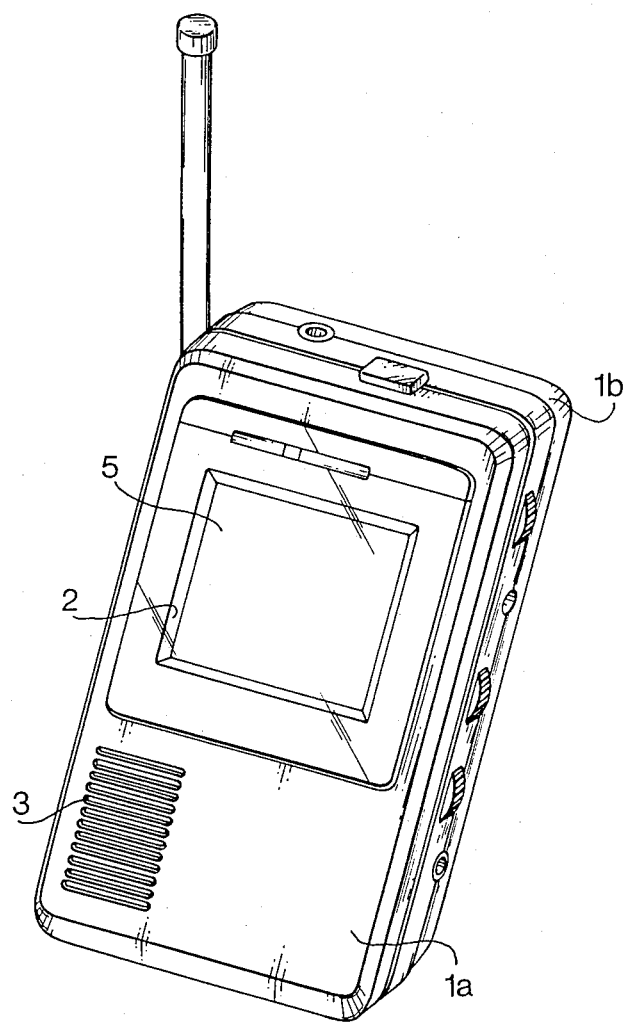
FIG. 1 is a perspective view of a liquid crystal television receiver employing a lighting device according to the present invention.
Figure 2:
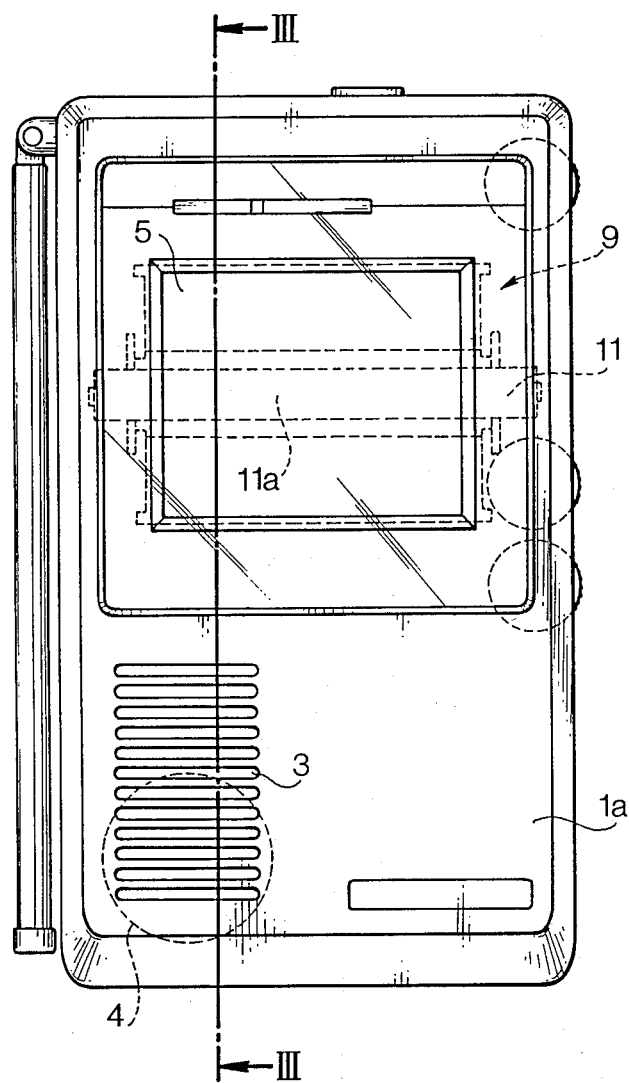
FIG. 2 is a plan view of the receiver.
Figure 3:
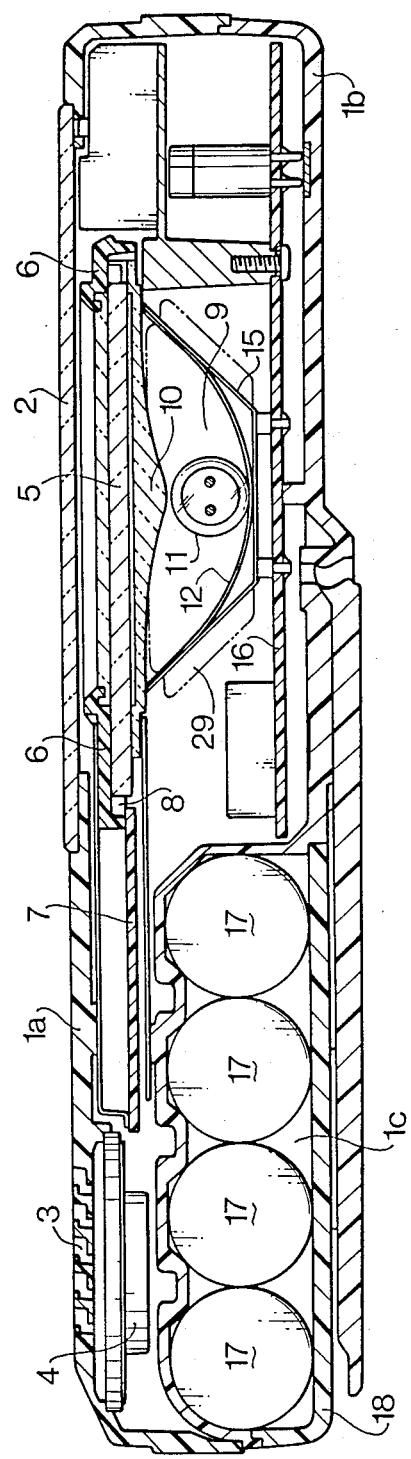
FIG. 3 is a sectional view of the receiver taken along line III—III of FIG. 2.

Referring to FIGS. 1 to 3, the liquid crystal television receiver has an upper case 1a and a lower case 1b. The upper case 1a has a window 2 for a liquid crystal display panel 5 of a liquid crystal display device, and a plurality of sound emanating apertures 3 for a loudspeaker 4. On a peripheral side portion of the receiver, external manipulating means such as tuning and volume dials, knobs, output terminals, and a receiving rod antenna are provided.

As shown in FIG. 3, the liquid crystal display panel 5 is supported by a panel supporting frame 6 and electrically connected to circuits on a first circuit board 7 including a display driving circuit by a connector 8. Underside the display panel 5, a lighting device 9 having a fluorescent lamp 11 is provided, interposing a diffusion plate 10. The lighting device 9 is secured to a second circuit board 16 which is mounted on the lower case 1b. Batteries 17 are mounted in a battery compartment 1c formed in the lower case 1b and supported in the compartment 1c by means of a cover 18.

Figure 4:
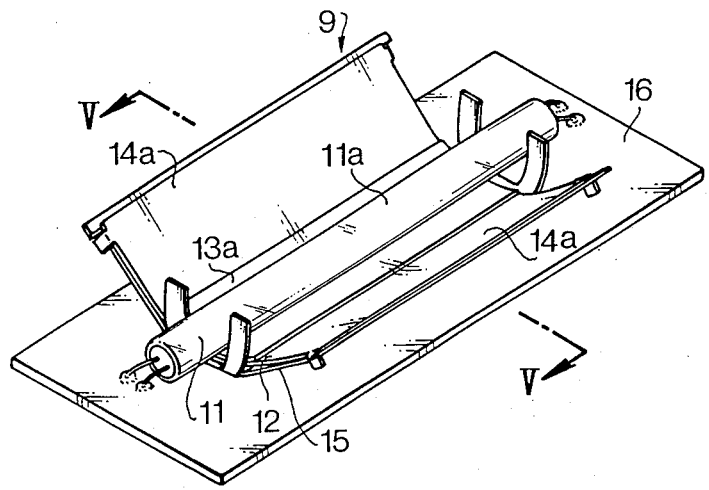
FIG. 4 is a perspective view of the lighting device according to the present invention.
Figure 5:
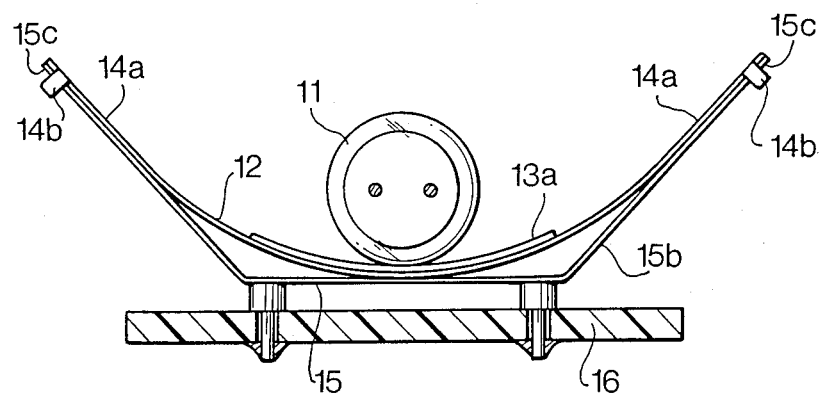
FIG. 5 is a sectional view of the lighting device taken along a line V—V of FIG. 4.

Referring to FIGS. 4 and 5, the lighting device 9 comprises a fluorescent lamp 11 having a light emitting straight portion 11a, a reflector holder 15, and a reflector plate 12.

As shown in FIG. 2, the lighting device 9 is so arranged under the display panel 5 that the light emitting straight portion 11a of the lamp 11 is disposed in the horizontal direction at a central portion corresponding to the display panel 5. The lamp 11 is connected to the second circuit board 16 through power supply leads. A plate 29 is provided on both end portions of the lamp 11 for preventing the light from leaking out from the end portions.

The reflector holder 15 is made by bending a metal plate and secured to the second circuit board 16.

Figure 7:
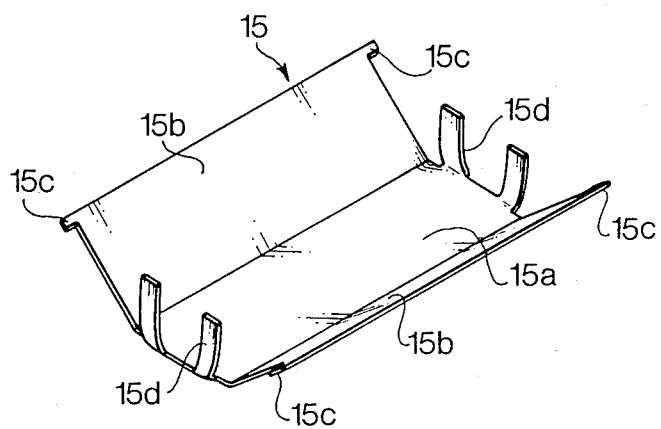
FIG. 7 is a perspective view of a reflector holder.

As shown in FIG. 7, the reflector holder 15 has a base portion 15a, and a pair of upwardly bent side portions 15b, 15b symmetrically formed on opposite sides of the base portion 15a. A pair of guide members 15d are provided on the base portion 15a at longitudinal both ends thereof for supporting the lamp 11. A pair of hook portions 15c are formed on each inclined portion 15b at corners thereof.

Figure 6:
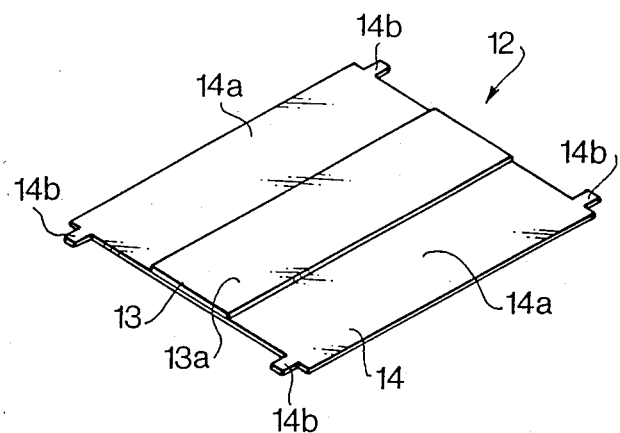
FIG. 6 is a perspective view of a reflector plate provided in the lighting device.

Referring to FIG. 6, the reflector plate 12 is a flexible base plate 14 having a diffuse reflection surface 14a. Engaging projections 14b are formed at four corners of the plate 14. A plate 13 having a total reflection surface 13a is fixed to a central portion of the plate 14. Thus, the reflector plate 12 consisting of a pair of diffuse reflection portions 14a, 14a and the total reflection portion 13a interposed there-between is provided. For example, as diffuse reflection base plate 14, a white polyester film is used. As total reflection plate 13, a transparent polyester film on which an aluminum thin film is coated by vacuum deposition so as to form a mirror surface is used.

In order to attach the reflector plate 12 to the holder 15, each engaging projection 14b is outwardly bent as shown in FIG. 5 and diffuse reflection portions 14a, 14a are upwardly curved along the inclined portions 15b of the holder 15. The total reflection portion 13a corresponds to the base portion 15a and each engaging projection 14b is engaged with an underside portion of the hook portion 15c. Thus, the reflector plate 12 is secured to the holder 15 to restrain the reflector plate from upwardly removing. The lamp 11 is engaged with the guide members 15d. Thus, the reflector plate 12 surrounds the underside and side portions of the lamp 11. Namely, total reflection surface portion 13a having a mirror surface is disposed adjacent the underside of the light emitting straight portion 11a and opposite diffuse reflection surface portions 14a, 14a having high diffusion reflectance are disposed along opposite side portions of the light emitting straight portion 11a. Thus, reflector plate 12 is disposed for effectively reflecting the light of the lamp 11 to the display panel 5 through the diffusion plate 10 and uniformly lightening the display zone of the display panel 5.

As shown in FIG. 3, the diffusion plate 10 has a central thick portion formed corresponding to the light emitting portion 11a of the lamp 11, so that quantity of the light passing the thick portion reduces to prevent a local high luminance at a portion adjacent the light emitting portion 11a.

Figure 8:
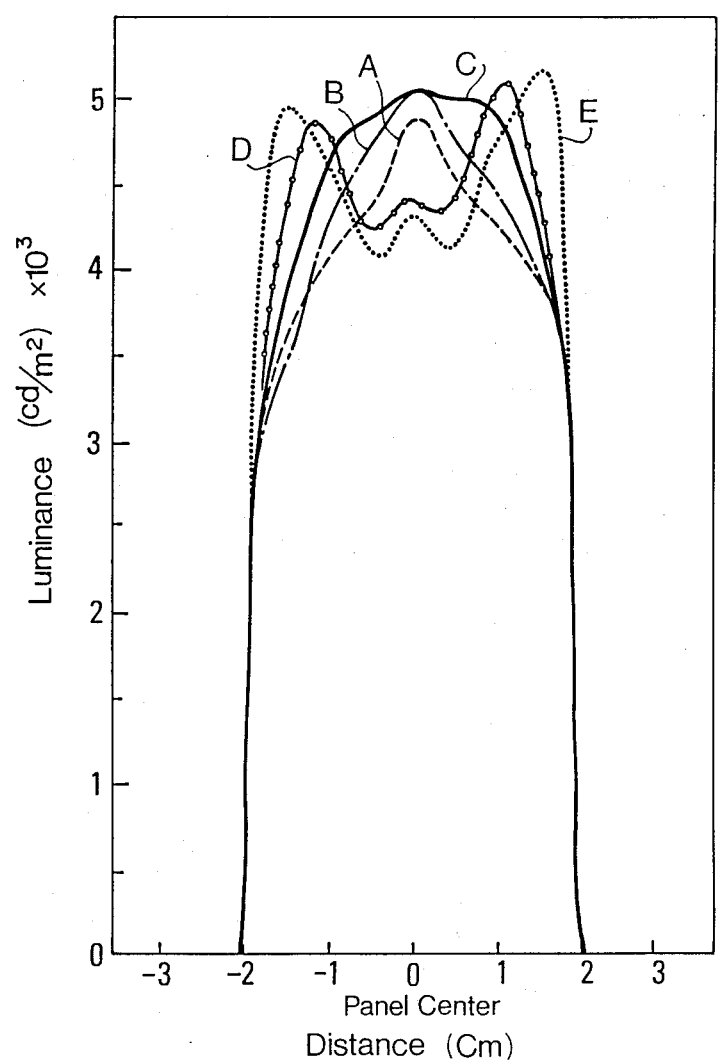
FIG. 8 is graphs showing luminance characteristics of the lighting device.

FIG. 8 shows graphs of luminance characteristics on the surface of the diffusion plate 10 when areas of the total reflection surface and the diffuse reflection surface of the reflector plate are changed at various rates.

A line A shows the luminance on the plate 10 in the case the reflector plate 12 has a diffuse reflection surface only. A line B shows the luminance when diffuse reflection portions provided on opposite sides of the total reflection portion are 2 cm in width respectively, and ratio of the area of total reflection surface to the area of diffuse reflection surface is 1:8. The luminance shown by a line C is obtained when each of diffuse reflection portions is 1.5 cm in width with ratio 1:2. A line D is obtained when each diffuse reflection portion is 1 cm with ratio 1:1. A line E shows the luminance when the reflector plate has a total reflection surface only.

It will be seen that when the ratio of the total reflection area to the diffuse reflection area is 1:2, a most effecitve lighting with uniform luminance on the diffusion plate 10 is obtained.

Figure 9:
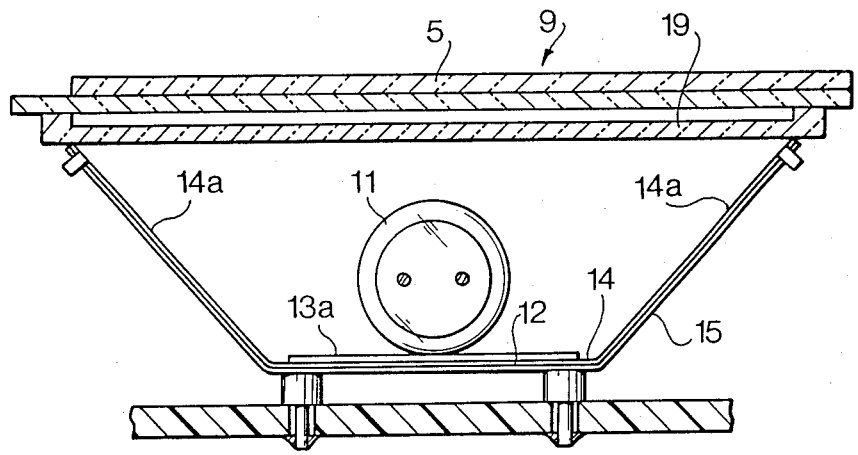
FIG. 9 is a sectional view showing a second embodiment of the present invention.

Referring to FIG. 9 showing another embodiment of the present invention, the reflector plate 12 is bent by heating border portions between the total reflector portion 13a and the diffuse reflector portions 14a so as to coincide the shape of the reflector plate 12 with that of the holder 15. Thus, the total reflection portion 13a is arranged in parallel to the display panel 5 and both diffuse reflection portions 14a, 14a are upwardly inclined at the same angles with the total reflection portion 13a. In this embodiment, a diffusion plate 19 is formed in uniformly flat. Accordingly, the same lighting effect as the previous embodiment can be achieved.

Figure 10:
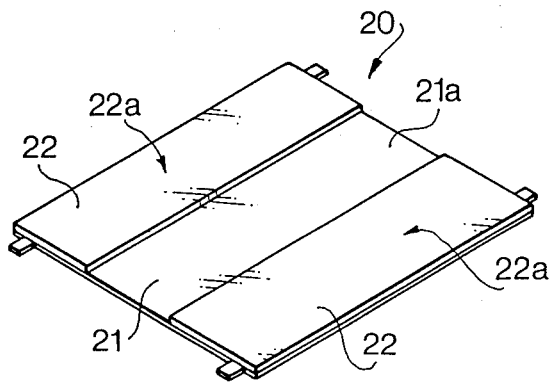
FIG. 10 is a perspective view showing another example of a reflector plate.

In place of the reflector plate 12 used in previous embodiments, another reflector plate as shown in FIG. 10 may be employed. A flexible base plate 21 for reflector plate 20 has a total reflection surface. A pair of plates 22 having diffuse reflection surfaces are attached to opposite sides of the base plate 21. Thus, the reflector plate 20 has a total reflection portion 21a disposed between diffuse reflection portions 22a, 22a.

Figure 11:
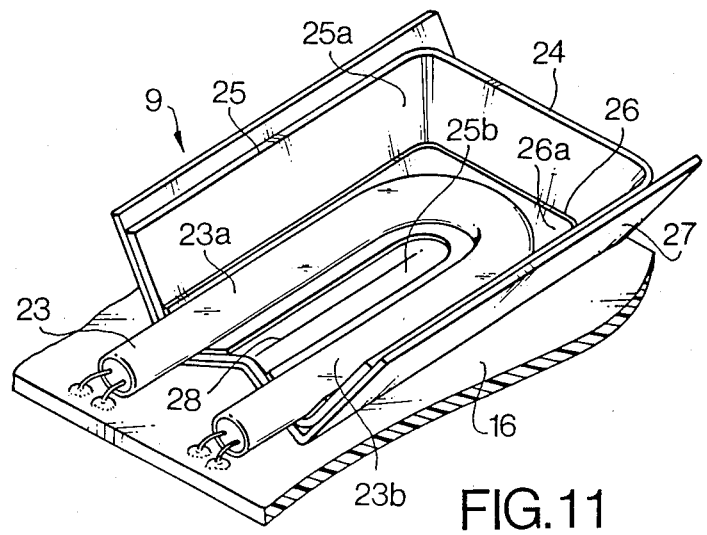
FIG. 11 is a perspective view showing a third embodiment of the present invention.

FIG. 11 shows the third embodiment of the present invention. In this embodiment, a U-shaped fluorescent lamp 23 having a pair of straight light emitting portions 23a, 23b is provided above a tray-shaped reflector plate 24 secured to a reflector holder 27. The reflector plate 24 comprises a base plate 25 having a diffuse reflection surface. The base plate 25 has a base portion 25b having a W-shaped section and a peripheral side inclined portion 25a with the diffuse reflection surface. To the base portion 25b, a U-shaped plate 26 having a total reflection portion 26a is attached. The lamp 23 is adapted to be disposed above the total reflection portion 26a. At a central border portion 28 between light emitting portions 23a, 23b, the base portion 25b is upwardly projected a height of the axis of light emitting portion 23a, for increasing reflection efficiency.

From the foregoing, it will be understood that the present invention provides a back-lighting device which uniformly lights the liquid crystal display device by the reflector plate having the disposition of the total reflection surface under the lamp and diffuse reflection surfaces adjacent both sides of the total reflection surface.

While the invention has been described in conjunction with preferred specific embodiments thereof, it will be understood that this description is intended to illustrate and not limit the scope of the invention, which is defined by the following claims.

What is claimed is

1. A lighting device for a liquid crystal display device having a liquid crystal display panel, comprising:
    a lamp having a light emitting straight portion and provided under the liquid crystal display panel; and
    a reflector plate having a central portion provided under the light emitting straight portion and a pair of side portions adjacent both sides of the central portion, the central portion having a substantially total reflection surface, and each the side portion having a diffuse reflection surface.

2. The lighting device according to claim 1 wherein the reflector plate is curved so as to surround the light emitting straight portion of the lamp.

3. The lighting device according to claim 2 wherein ratio of the area of the total reflection surface to the total area of the diffuse reflection surfaces is 1:2.

4. The lighting device according to claim 1 wherein the reflector plate has a flat portion in parallel with the liquid crystal display panel and a pair of side portions which are upwardly bent at both sides of the flat portion.

5. The lighting device according to claim 3 wherein the total reflection surface is provided on the flat portion and the diffuse reflection portions are provided on the side portions.

6. The lighting device according to claim 5 wherein ratio of the area of the total reflection surface to the total area of the diffuse reflection surfaces is 1:2.

7. The lighting device according to claim 1 wherein the reflector plate is a flexible plate having a diffuse reflection surface, and the total reflection surface is formed by attaching mirror material.

8. The lighting device according to claim 7 wherein ratio of the area of the total reflection surface to the total area of the diffuse reflection surfaces is 1:2.

9. The lighting device according to claim 1 wherein the reflector plate is a flexible plate having a total reflection surface, and each diffuse reflection surface is formed by attaching a plate having a diffuse reflection surface.

10. The lighting device according to claim 1 further comprising a holder for holding the reflector plate.

11. The lighting device according to claim 1 wherein ratio of the area of the total reflection surface to the total area of the diffuse reflection surfaces is 1:2.

12. The lighting device according to claim 1 wherein the lamp has a plurality of light emitting straight portions.

13. The lighting device according to claim 12 wherein ratio of the area of the total reflection surface to the total area of the diffuse reflection surfaces is 1:2.

* * * * *